United States Patent [19]

Biermanns et al.

[11] Patent Number: 5,176,895
[45] Date of Patent: Jan. 5, 1993

[54] PROCESS FOR THE CONTINUOUS PRODUCTION OF SODIUM AZIDE

[75] Inventors: Franz-Josef Biermanns, Troisdorf; Hans-Heinz Heidbuechel, Cologne; Heinz-Gerd Emans, Niederkassel; Ralf Weber, Troisdorf, all of Fed. Rep. of Germany

[73] Assignee: Dynamit Nobel Aktiengesellschaft, Troisdorf, Fed. Rep. of Germany

[21] Appl. No.: 726,839

[22] Filed: Jul. 8, 1991

[30] Foreign Application Priority Data

Jul. 6, 1990 [DE] Fed. Rep. of Germany ....... 4021615

[51] Int. Cl.⁵ .............................................. C01B 21/08
[52] U.S. Cl. .................................................... 423/410
[58] Field of Search ........................................ 423/410

[56] References Cited

U.S. PATENT DOCUMENTS 2,994,583  8/1961  Levering ............................. 423/410

FOREIGN PATENT DOCUMENTS 1144243  2/1963  Fed. Rep. of Germany .
369529  3/1932  United Kingdom ............... 423/410
1082021  9/1967  United Kingdom ............... 423/410

OTHER PUBLICATIONS

Alien Property Custodian Ser. No. 324,626, published Jun. 1, 1943, Meissner.
T. Urbanski, "Chemistry and Technology of Explosives", 1985, Oxford GB, Chemical Abstracts, vol. 84, No. 18.

Primary Examiner—Wayne Langel
Attorney, Agent, or Firm—Antonelli, Terry, Stout & Kraus

[57] ABSTRACT

The present invention deals with the continuous production of sodium azide from sodium amide and nitrous oxide. This reaction takes place on a support material for sodium amide consisting of a mixture of sodium azide and sodium hydroxide. This mixture is passed through a reactor maintained at temperatures of between 200° and 270° C.; a portion of the reaction product and the support material are transferred out of the system at an end of the reactor, and a primary quantity of the reaction product and support material are returned to the reactor inlet where the material is combined with fresh, heated sodium amide in an amount corresponding to the quantity of sodium azide transferred-out with the reaction product and support material. With the aid of this continuous process, higher space-time yields of sodium azide can be obtained than in case of the conventional methods without increasing the danger of no longer controllable explosions.

9 Claims, 1 Drawing Sheet

PROCESS FOR THE CONTINUOUS PRODUCTION OF SODIUM AZIDE

BACKGROUND OF THE INVENTION

This invention relates to a continuous process for the production of sodium azide wherein sodium amide on a support material of sodium azide and sodium hydroxide is reacted with nitrous oxide or dinitrogen monooxide ($N_2O$).

The production of sodium azide has heretofore been conducted by reacting sodium amide with nitrous oxide at temperatures of above 190° C. At this temperature, sodium amide is present in the molten phase. For this reason, it is applied to a support material of sodium azide and sodium hydroxide. The reaction is performed discontinuously in mixing reactors permitting because of the size of the reactors maximally the conversion of 130 kg of sodium amide within 8 hours.

During the reaction between sodium amide and nitrous oxide, water is formed in addition to the target product, sodium azide; this water reacts with sodium amide leading to the formation of ammonia and sodium hydroxide. Since ammonia and nitrous oxide form an explosive mixture, the aforedescribed mode of operation for producing sodium azide has given rise to explosions in case the two gases are in an explosive mixing range. Consequently, enlargement of the reactor volume to increase the space-time yield in this conventional process would considerable heighten the danger of explosions, which are no longer controllable.

Therefore, the problem presents itself of guiding the reaction between sodium amide and nitrous oxide in such a way that sodium azide is obtained in a considerably larger space-time yield than in the disclosed methods without incurring the aforedescribed disadvantages.

SUMMARY OF THE INVENTION

In meeting this objective, in accordance with the invention a continuous process for the production of sodium azide has now been found wherein nitrous oxide ($N_2O$) is reacted with sodium amide arranged on a support material of sodium azide and sodium hydroxide in a reactor at temperatures of between 200° and 270° C., characterized by separating at least about 5% by weight of the solid material discharge from the reactor to provide a first product stream containing a mixture of sodium azide and sodium hydroxide (which include newly formed products and support material) and a second product stream with the remainder of the discharged material; the first product stream being removed from the system and the second product stream being recycled to the reactor and $NH_3$ and excess $N_2O$ being discharged from the reactor in a zone of an inlet section of the reactor.

It is possible with the aid of this process to increase the space-time yield in the reaction of sodium amide with nitrous oxide by a multiple as compared with the above-disclosed known process without increasing the total gas volume of ammonia and nitrous oxide to such an extent that uncontrolled gas explosions occur.

In the reactor which preferably is a mixing/conveying reactor, molten sodium amide provided on the support material - - - denoted hereinbelow also as "solid reaction material" - - - is transported in the direction toward a product stream divider, whereby it is reacted with nitrous oxide ($N_2O$) to form sodium azide ($NaN_3$) and sodium hydroxide (NaOH).

Appropriate mixing-conveying units are known to a person skilled in the art; examples that can be cited are screw conveyors or kneader mixers preferably located in a tubular reactor.

The mixing/conveying reactor is maintained at an internal temperature of between 200° and 270° C.; the reaction is preferably performed at a temperature of between 230° and 270° C.

The solid reaction material and the reaction products including newly formed sodium azide and sodium hydroxide pass from the mixing reactor into a product stream divider directly adjoining the outlet section of the reactor; the product stream divider can also optionally be integrated into the reactor on an end facing away from the inlet section. The reaction material, after leaving the reactor, need no longer be heated to the reaction temperature; however, a special cooling step is likewise unnecessary since the main portion of the solid reaction material is from there again conducted to the inlet section of the reactor where this portion must again be heated to the reaction temperature.

In the product stream divider, from 5 to 10% by weight of the reaction mixture obtained at that point is transferred out of the system. From the removed material, the sodium azide contained therein is obtained by conventional methods. For example, after cooling, the mixture is dissolved in water and subsequently such a quantity of water is distilled off from the resulting aqueous solution that the sodium azide is precipitated in the aqueous medium. The sodium azide is then filtered off and can be purified, if desired, by recrystallization.

The main quantity of solid reaction material and the remainder of the newly formed sodium azide and sodium hydroxide leaving the product stream divider are reintroduced into the inlet section of the mixing reactor by way of suitable conveying means. It is advantageous to heat the conveying means so that the material being conveyed will not cool down too much and a minimum of additional energy needs to be expended during heating of the material in the reactor.

Before the recycled material is made to contact the nitrous oxide in the mixing reactor, fresh, preheated sodium amide is added to this material stream in a quantity corresponding to the quantity of sodium azide transferred out in the product stream divider. Suitably, this addition takes place shortly prior to entrance of the recycled solid material into the reactor. However, it is also possible to effect the addition in the inlet section of the reactor.

The sodium amide added to the returned reaction material is preferably heated to a temperature at which it is present in the liquid phase. In principle, it is also possible to conduct the heating step to a temperature corresponding to the temperature exhibited by the recycled material. The nitrous oxide is passed countercurrently to the stream of solid material through the reactor. Preferably, the nitrous oxide is introduced into the system at the product stream divider; however, it can also be introduced at the outlet section of the reactor. A stoichiometric excess is utilized; the excess gas in withdrawn, together with the ammonia formed during the reaction in the reactor at the inlet portion of the mixing reactor.

It is advantageous to separate out of the withdrawn gaseous mixture, the nitrous oxide from the ammonia in a manner known per se and to recycle this nitrous oxide into the process.

The amount of nitrous oxide to be employed is to be at least so large that one mole of nitrous oxide is used per two moles of sodium amide. An excess past this stoichiometric ratio is advantageous. The excess can range up to 50% above this ratio.

A mixture of sodium azide and sodium hydroxide, also called crude azide, serves as the support material for the sodium amide. Preferably, these two compounds in this mixture are in a molar ratio of 1:1. Exceeding this ratio in the upward or downward direction by up to 10% is readily possible.

At the beginning of the reaction, the crude azide is charged into the reactor and heated to the reaction temperature. Since both compounds or components of the crude azide are constantly newly formed during the process in a molar ratio of 1:1, neither of the two compounds needs to be supplemented during the process.

BRIEF DESCRIPTION OF THE DRAWINGS

The process according to this invention will be further described by way of example with reference to the accompanying drawings wherein.

DETAILED DESCRIPTION OF THE INVENTION

Figure 1:
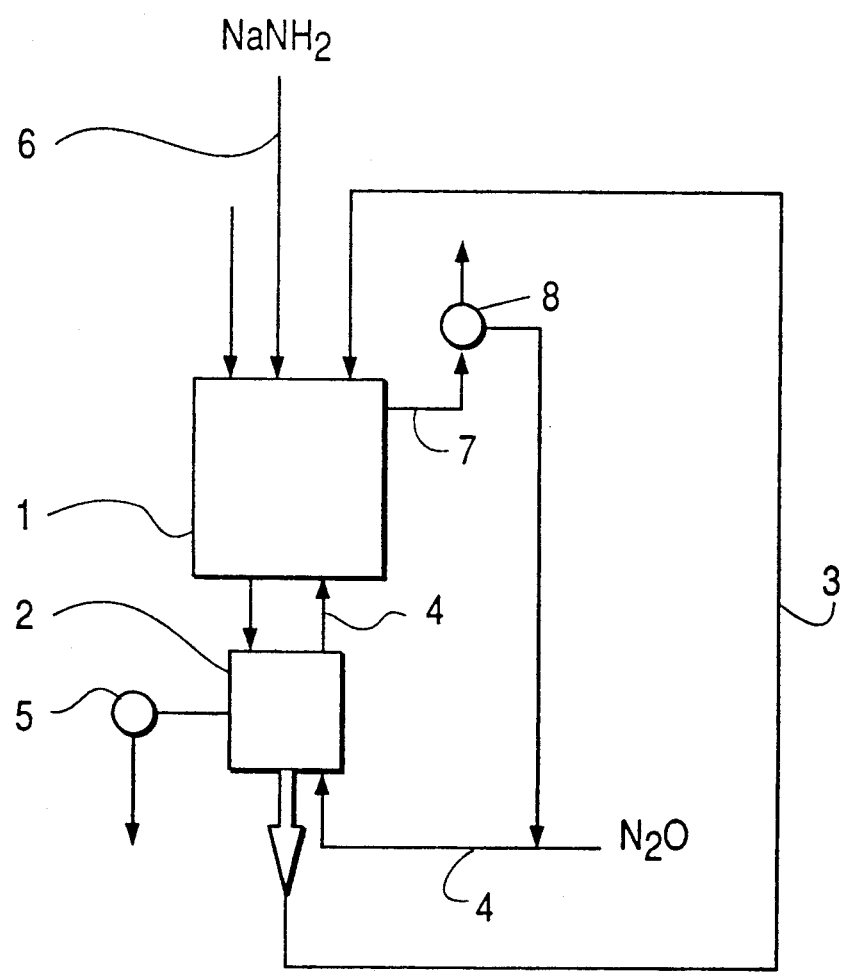
FIG. 1 is a schematic diagram of the apparatus for conducting the process.

The tubular reactor 1 of a testing plant, initially rendered inert with nitrogen gas, is filled with 320 kg of crude azide ($NaN_3$/NaOH in a molar ratio of 1:1) as support material, and interior of the reactor as well as the recycle screws 3 of a screw conveyor for recycling solid material from the product divider to the reactor are preheated to a temperature of 240° C. Subsequently, 0.3 kg of sodium amide at a temperature of 300° C. is added, in metered amounts, via conduit 6 and $N_2O$ is introduced via conduit 4 in a quantity stream of 200 l/min. After onset of the reaction—recognizable by a temperature elevation in the reaction zone and by analyzing the waste gas in conduit 7 for ammonia—molten sodium amide (0.78 l/min corresponding to about 60 kg/h) is continuously added to the recycled reaction mixture of sodium azide and sodium hydroxide via conduit 6, the solid reaction products and support material are recycled via the recycle screws 3, and the $N_2O$ stream is increased to a value of 435 l/min corresponding to an excess of 34%. The reactor is then continuously operated in this way by withdrawing from the product stream divider 2, integrated into the reactor 1, continuously via the gate valve 5 under complete reaction of the sodium amide, 1.6 kg/min of a mixture of NaOH and $NaN_3$ (equimolar mixture) and removing at the reactor inlet section via conduit 7 the excess $N_2O$ as well as 0.2175 kg/min of $NH_3$; the reaction material and newly formed solid products that have not been withdrawn are recycled into the reactor 1 by way of the recycle screws 3. In separator 8, the ammonia is separated from the nitrous oxide, and the nitrous oxide is introduced into conduit 4.

The reaction is terminated by interrupting the amide feed, and the reactor can be taken out of operation after a post reaction period of 30 minutes during which time the feed of gaseous $N_2O$ is not interrupted.

If one compares the continuous addition of sodium amide at about 60 kg/h, corresponding to approximately 480 kg within 8 h, with the throughput according to the discontinuous method according to the prior art, amounting to 130 kg in 8 h, the pilot plant itself will increase output by a factor of about 3.6.

What is claimed is:

1. A process for the continuous production of sodium azide by a reaction of nitrous oxide and sodium amide, which sodium amide is arranged on a support of solid reaction material of sodium azide and sodium hydroxide, at a temperature of between 200° and 270° C., which comprises transferring the solid reaction material in a cycle through a reactor, maintained at the reaction temperature, through an adjoining product stream divider and through a subsequently arranged conveying means back to the reactor; introducing the nitrous oxide, via a conduit countercurrently to the passage of the solid reaction material, into the reactor; in the product stream divider, separating out and removing between 5 and 10% by weight of a solid product mixture received from the reactor via the product stream divider to obtain sodium azide contained in said product mixture as a sodium azide-containing product; recycling the remaining 90 to 95% by weight of the product mixture via the conveying means to said reactor thereby providing additional solid reaction material serving as a support for sodium amide; introducing an amount of sodium amide corresponding to the sodium azide in the sodium azide-containing product separated-out and removed with the product mixture via another conduit into an inlet section of the reactor; and discharging ammonia formed during the reaction, as well as excess nitrous oxide, from the inlet section of the reactor via a conduit connected to the inlet section.

2. A process according to claim 1, where the product stream divider and the conveying means are maintained at temperatures of between 100° and 250° C.

3. A process according to claim 1 or 2, where the reactor comprises a tubular reactor wherein the solid material within the reactor is transported with the aid of mixing-conveying means.

4. A process according to claim 1 or 2 wherein the excess nitrous oxide is recycled into the reactor after removal of the ammonia.

5. A process according to claim 1 wherein the product mixture comprises an equimolar mixture of sodium azide and sodium hydroxide.

6. A process according to claim 1 wherein the nitrous oxide is introduced into the reactor via the product stream divider.

7. A process according to claim 5, wherein the sodium amide is introduced into the reactor in the molten state.

8. A process according to claim 1, wherein the sodium amide is introduced into the reactor in the molten state.

9. A process according to claim 1, further comprising during initial start up of the process introducing a charge of a mixture of sodium azide and sodium hydroxide into the reactor to provide the solid reaction material serving as a support for sodium amide introduced into the reactor.

* * * * *